(12) United States Patent
Abe (10) Patent No.: US 6,271,964 B1
(45) Date of Patent: Aug. 7, 2001

(54) CLOSE-UP ATTACHMENT LENS FOR A BINOCULAR

(75) Inventor: Tetsuya Abe, Hokkaido (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/348,636

(22) Filed: Jul. 6, 1999

(30) Foreign Application Priority Data

Jul. 3, 1998 (JP) .................................................. 10-188763

(51) Int. Cl.⁷ ............................ G02B 23/00; G02B 21/22
(52) U.S. Cl. ............................. 359/409; 359/377; 359/407
(58) Field of Search .................................. 359/375–387, 359/405–410, 419–422, 429, 432, 466, 471–482, 618, 672–673

(56) References Cited

U.S. PATENT DOCUMENTS

| | | | |
|---|---|---|---|
| 4,178,072 | * 12/1979 | Rogers | 359/482 |
| 4,640,586 | * 2/1987 | Iba et al. | 359/656 |
| 4,657,357 | 4/1987 | Nishimura et al. | 359/385 |
| 4,779,965 | * 10/1988 | Beecher | 359/480 |
| 4,836,188 | * 6/1989 | Berry | 359/481 |
| 5,074,650 | * 12/1991 | Yamagishi et al. | 359/377 |
| 5,191,203 | * 3/1993 | McKinley | 359/738 |
| 5,479,293 | * 12/1995 | Reed | 359/409 |
| 5,612,816 | 3/1997 | Strahle et al. | 359/376 |
| 5,702,350 | 12/1997 | Vry et al. | 600/166 |
| 5,930,034 | * 7/1999 | Fukumoto | 359/381 |

FOREIGN PATENT DOCUMENTS 50-80849   7/1975   (JP) .

* cited by examiner

Primary Examiner—Thong Nguyen
(74) Attorney, Agent, or Firm—Greenblum & Bernstein P.L.C.

(57) ABSTRACT

A close-up attachment lens for a binocular includes a close-up lens group located on the object side of a pair of objective lenses of the binocular and is detachably attached to the binocular on the object side of the objective lenses. The close-up lens group is provided with a single optical system of positive power which covers the pair of objective lenses and has an optical axis parallel with and spaced from optical axes of the objective lenses at an equal distance. A pair of aperture stops are provided in front of the corresponding objective lenses of the binocular when the close-up attachment lens is attached to the binocular.

18 Claims, 10 Drawing Sheets

CLOSE-UP ATTACHMENT LENS FOR A BINOCULAR

BACKGROUND OF TEE INVENTION

1. Field of the Invention

The present invention relates to a close-up attachment lens which is attached to a front end (object side) of a binocular and which is located in front of a pair of objective lenses thereof to enlarge an image of an finite distance object.

2. Description of the Related Art

In a monocular telescope or the like, a close-up attachment which can be attached to a front portion of an objective lens of the telescope and permits a user to view an enlarged image of an object at a close proximity, is known in the art. However, no such attachment for a binocular is known.

SUMMARY OF THE INVENTION

It is an object of the present invention to provide a close-up attachment lens for a binocular.

A binocular is usually designed for viewing distant objects, therefore, if two close-up attachment lenses are attached to the front (object side) of each objective lens system of a binocular, objects at a close proximity cannot be viewed through both lenses as a single image, or fatigue of the viewer's eyes may be caused by the viewer attempting to view a double image as a single image. This is because rays of light emitted from the same object point which are incident upon the pair of close-up lens groups and the pair of objective lenses of the binocular, and emitted from the pair of eyepieces of the binocular, are not parallel. In such a case, the vergence of the objective lens systems can (in theory) be adjusted so as to coincide. For example, the optical axes of the close-up lens systems can be decentered with respect to the optical axes of the objective long systems of the binocular, or a prism can be provided at an appropriate position within the optical path thereof so that the lines of sight can be bent inwards. However, such adjusting methods require extremely high precision, which is difficult to achieve; and even if achieved, there is a tendency for error to occur due to shock etc. For the above-mentioned reasons, the detachable close-up attachment lens of the present invention is not directed towards the attachment thereof to each individual objective lens system of a binocular.

It is another object of the present invention to provide a close-up attachment lens for a binocular in which no complex adjustment of the optical axis is necessary, and where there is no tendency for the optical axis to deviate due to shock etc.

To achieve the objects mentioned above, according to the present invention, there is provided a close-up attachment lens for a binocular, which is detachably attached on the object side of a pair of objective lenses of the binocular, including: a close-up lens group of a single optical system of positive power, the close-up lens group being located on the object side of the pair of the objective lenses of the binocular, so that the close-up lens group covers the pair of objective lenses and has an optical axis parallel with, and spaced from, optical axes of the objective lenses at an equal distance, and a pair of aperture stops, the aperture stops being located in front of the corresponding objective lenses of the binocular when the close-up attachment lens is attached to the binocular.

Preferably, the pair of aperture stops are provided behind the close-up lens group.

Preferably, the diameter of the aperture stops is set to be smaller than an effective aperture of the objective lenses of the binocular.

At least one reflection mirror can be provided, the reflection mirror being located in front of the objective lenses of the binocular when the close-up lens is attached to the binocular.

Preferably, the reflection mirror is provided behind the close-up lens group.

A pair of first reflection mirrors can also be provided behind the close-up lens group, corresponding to the objective lenses of the binocular to split, and deflect outward, light transmitted through the close-up lens group and a pair of second reflection mirrors to reflect the rays of light reflected by the first reflection mirrors toward the corresponding objective lenses of the binocular.

Preferably, a lighting optical system is also provided.

Preferably, the lighting optical system is provided behind the close-up lens system.

Preferably, the lighting optical system gathers light rays at the proximity of the object point via the refractive function of the close-up optical system.

Preferably, the light optical system includes a curved reflection mirror which reflects light rays toward the object side, wherein the lighting optical system has an optical axis which is parallel with the optical axis of the close-up lens group.

Preferably, the curved reflection mirror is a parabolic mirror.

Preferably, the close-up lens group includes a negative lens element and a positive lens element.

Preferably, the negative lens element and the positive lens element are arranged in this order from the object side.

The close-up lens group can include a negative lens element and two positive lens elements.

The close-up lens group can include negative lens element, a positive lens element, and another positive lens element, in this order from the object side. Preferably, the two positive lens elements in the close-up lens group are identical.

Preferably, the close-up lens group includes a cemented lens.

Preferably, the binocular is provided with a pair of ocular lens system corresponding to the pair of the objective optical systems, wherein the distance between the optical axes of the objective lenses is smaller than the distance between optical axes of the ocular optical systems.

The close-up attachment lens according to the present invention can be applied to any type of binocular. The close-up attachment lens can be particularly advantageously used with a binocular in which the distance between the optical axes of the objective lenses is smaller than the distance between the optical axes of the eyepieces, since the diameter of the close-up lens group can be reduced.

The present disclosure relates to subject matter contained in Japanese Patent Application No. 10-188763 (filed on Jul. 3, 1998) which is expressly incorporated herein by reference in its entirety.

BRIEF DESCRIPTION OF THE DRAWINGS

The Invention will be discussed below in detail with reference to the accompanying drawings, in which.

DESCRIPTION OF THE PREFERRED EMBODIMENTS

In general, a binocular is adjusted so that the optical axes of a pair of right and left optical systems are parallel, and hence parallel rays of light emitted from an infinite object point and incident upon the objective lenses of the binocular are emitted from a pair of eyepieces as parallel rays of light. Consequently, the object images viewed through viewer's right and left eyes can be recognized as a single image.

Divergent light emitted from an object point located at a front focus of a positive lens is collimated due to the converging function of the positive lens. In a preferred embodiment, a close-up attachment lens 10 for a binocular 20 includes: a close-up lens group 13 located on the object side of a pair of objective lenses 21 of the binocular 20. The close-up attachment lens 10 is detachably attached to the object sides of the objective lenses 21 of the binocular 20. The close-up lens group 13 includes a single optical system of positive power which covers the pair of objective lenses 21, and the optical axis 13X of the close-up lens group 13 is parallel with and spaced from the optical axes of the pair of objective lenses 21 of the binocular 20 at an equal distance. In this close-up attachment lens 10, if the object is located at the front focus of the close-up lens group 13, the light emitted from the close-up lens group 13 and received by the objective lenses 21 of the binocular 20 can be collimated and viewed. With this arrangement, the divergent light emitted from a single object point at a finite distance is collimated due to the converging function of the close-up lens group 13, and is split into a pair of parallel beams by an effective aperture of the pair of objective lenses 21 of the binocular 20 or by a pair of aperture stops 15 which are provided at the rear side (the user's eye side) of the close-up lens group 13 corresponding to the pair of objective lenses 21. The split parallel beams of light which are made incident upon the objective lenses 21 of the binocular 20 are emitted from the pair of eyepieces of the binocular 20, so that the object images viewed by the viewer's right and left eyes can be recognized as a single image.

Since the close-up lens group 13 incorporated in the close-up attachment lens 10 includes a single lens group which covers a pair of objective lenses 21, optical axis adjustment is not necessary, and a pair of beams incident upon the objective lenses 21 (of the binocular 20) can be made parallel with each other by locating the object point at the front focus of the close-up lens group 13. Furthermore, since the divergent light emitted from an optional object point located in a front focal plane of a positive lens group is collimated due to the converging function of the positive lens group, the function of the close-up lens group 13 mentioned above does not change, even if the position of the close-up lens group 13 is slightly deviated from the position of the objective lenses 21 of the binocular 20. Therefore, in the close-up attachment lens 10, the parallel beams emitted from the eyepieces can be maintained parallel even if there is a slight positional deviation between the close-up lens group 13 and the objective lenses 21 of the binocular 20 due to shock applied thereto etc.

The close-up attachment lens 10 is provided with a pair of aperture stops 15 at the rear of the close-up lens group 13 thereof, so that the aperture stops 15 are located in front of the objective lenses 21 of the binocular 20 when the close-up attachment lens 10 is attached to the binocular 20. The pair of aperture stops 15 make it possible to reduce the diameter of the close-up lens group 13, ease the aberration compensation requirements and restrict aberration fluctuation. If aperture stops are not provided, the light passing through the close-up lens group 13 is restricted by the effective aperture (clear aperture) of the objective lenses 21 of the binocular 20. If the close-up lens group 13 has aberration (for example, spherical aberration), coma aberration which is asymmetric with respect to the optical axis of the binocular is produced in a combination with the binocular 20, thus resulting in a deterioration of the image quality. To prevent this, it is preferred that the close-up lens group 13 is constituted from an optical system in which the aberrations are appropriately compensated. In particular, in the close-up attachment lens 10 used in combination with a binocular 20 having large aperture objective lenses 21, the aberrations of the close-up lens group 13 mast be highly precisely compensated and the lens diameter of the close-up attachment lens 10 is increased, thus resulting in an increase in the manufacturing cost.

Conversely, since the aperture stops 15 are provided between the close-up lens group 13 and the respective objective lenses 21 to reduce the diameter of the bundle of beams passing through the close-up lens group 13, not only can the correction of aberrations in the close-up lens group 13 be facilitated, the close-up lens diameter can also be reduced. Consequently, the manufacturing cost and the weight of the close-up attachment lens 10 can be reduced.

Moreover, it is assumed that the close-up attachment lens 10 is detachably attached to the binocular 20, however, it is difficult to maintain the positional relationship between the optical axis of the close-up lens group 13 and the optical axis of the objective lenses 21 of the binocular 20 always constant; and therefore, it is likely that a positional deviation is caused therebetween at each attachment or detachment. In an arrangement in which the quantity of light passing through the close-up lens group 13 is defined by the effective aperture of the objective lenses 21 of the binocular 20, coma aberration is caused each tin the close-up attachment lens 10 is attached to, or detached from the binocular 20, due to the positional deviation of the close-up lens group 13 and the objective lenses 21 of the binocular 20. Contrary to this, since the aperture stop 15 is provided between the close-up lens group 13 and each of the objective lenses 21 of the binocular 20, so that the positional relationship between the stop and the close-up lens group 13 is fixed, the optical axis of the light passing through the close-up lens group 13 is always kept constant upon detachment of the close-up attachment lens 10 from, or attachment to, the binocular 20. Consequently, no aberration fluctuation takes place, thus resulting in a high image quality.

Figure 1:
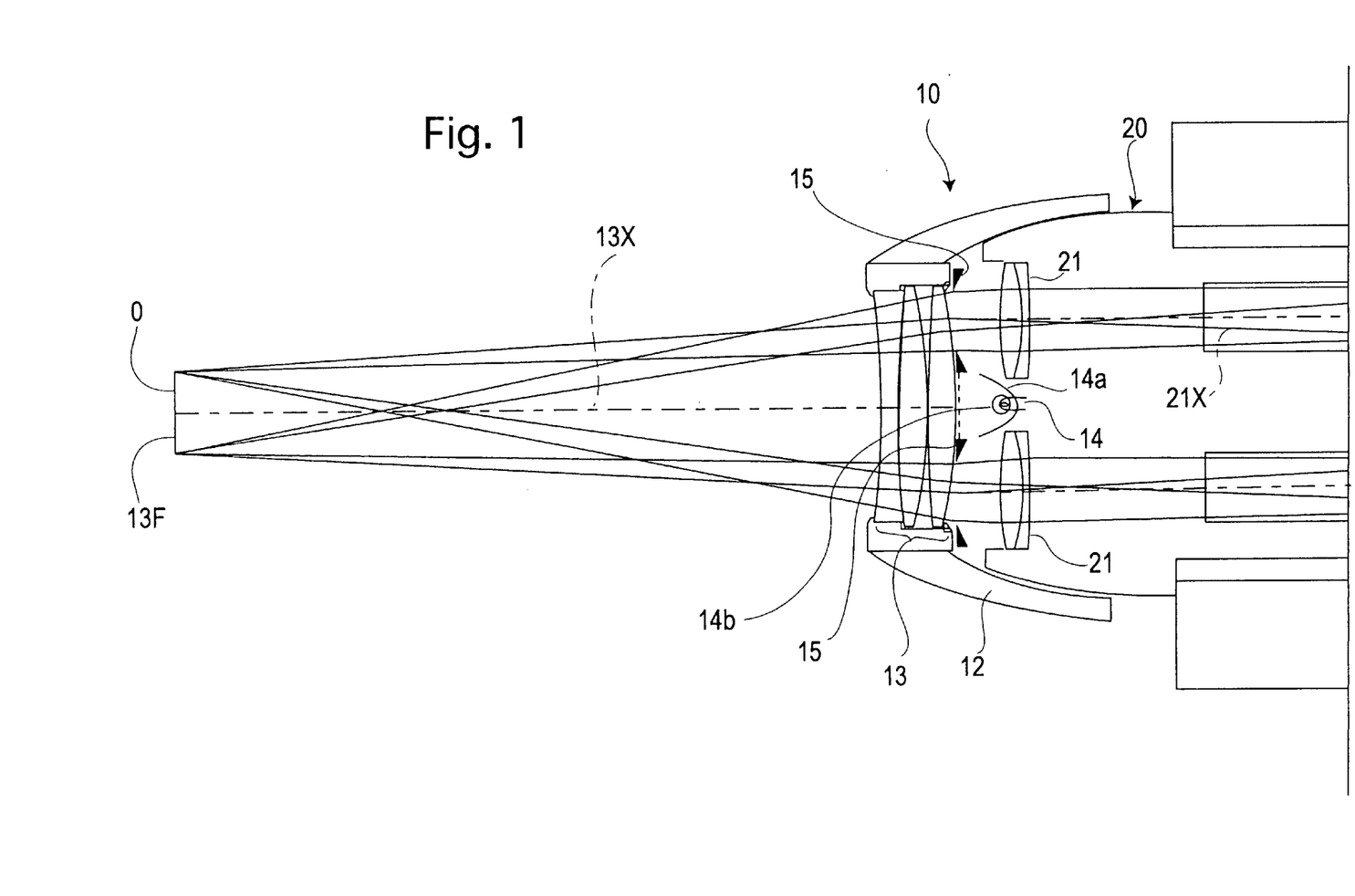
FIG. 1 is a plan view of a first embodiment of a close-up attachment lens for a binocular according to the present invention.
Figure 2:
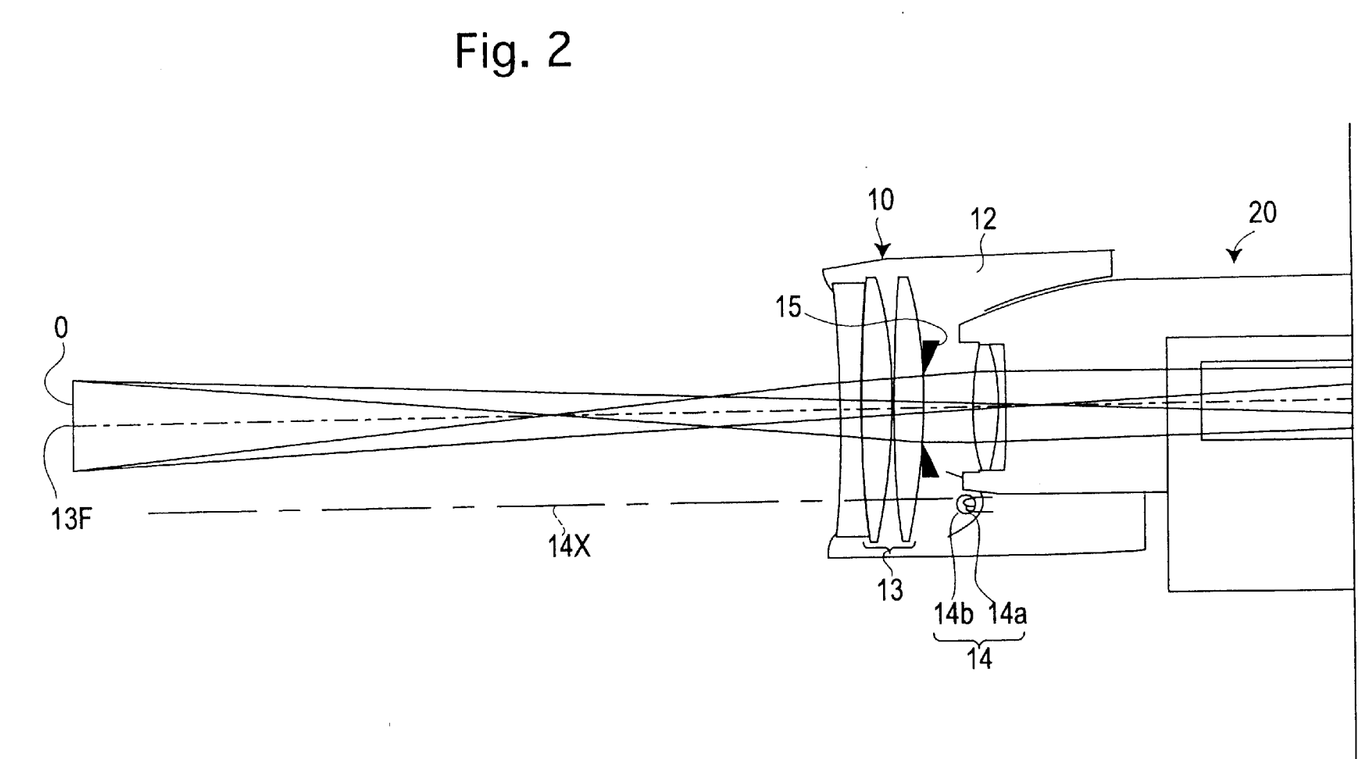
FIG. 2 is a side view of a close-up attachment lens shown in FIG. 1.

FIGS. 1 and 2 show a first embodiment of a close-up attachment lens 10. The close-up attachment lens 10 includes a detachable casing 12 which is detachably attached to a front end of a binocular 20 and is located in front of a pair of objective lenses 21 thereof. The casing 12 supports a close-up lens group 13 made of a single optical system which covers the pair of the objective lenses 21, a lighting device 14, and a pair of aperture stops 15. The optical axis 13X of the close-up lens group 13 extends in parallel with the pair of optical axes 21X of the objective lenses 21, and extends therebetween, so that the optical axis 13X is spaced from the optical axes 21X at an equal distance when the close-up attachment lens 10 is attached to the binocular 20. The pair of aperture stops 15 which correspond to the pair of objective lenses 21 are located behind the close-up lens group 13. The diameter of the aperture stops 15 is smaller than the effective aperture of the objective lenses 21.

The pair of the aperture stops 15 are symmetrically arranged with respect to the optical axis 13X of the close-up lens group 13 and restrict the quantity of light incident upon the pair of objective lenses 21 of the binocular 20. The diameter of the aperture stops 15 is smaller than the effective aperture of the objective lenses 21 of the binocular 20, so that if there is a positional deviation between the close-up attachment lens 10 and the binocular 20 or the distance between the optical axes 21X of the objective lenses 21 changes during the adjustment of the interpupillary distance, it is still possible to intercept flare or stray light.

Figure 5:
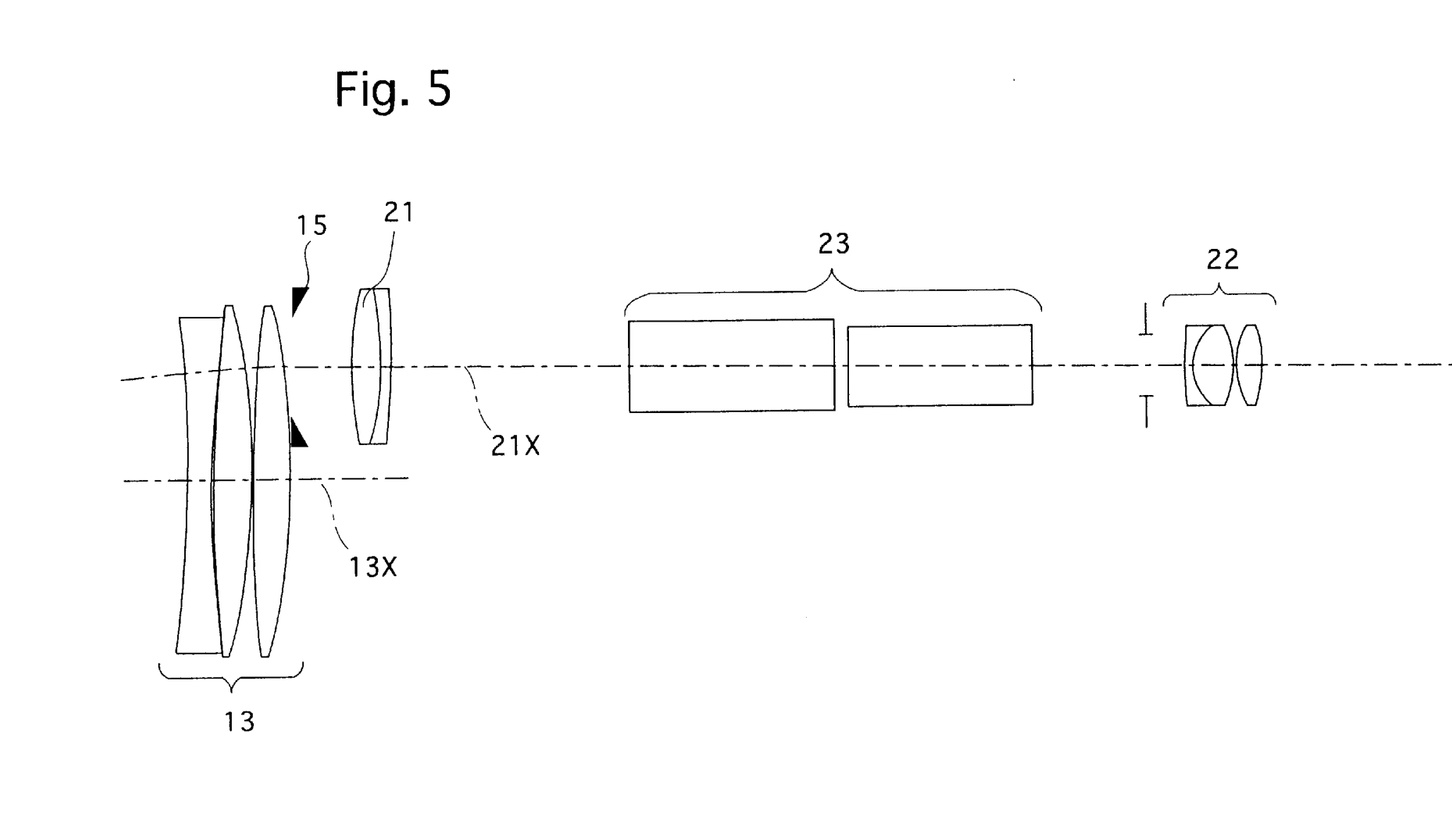
FIG. 5 is a developed view of an optical system in embodiments shown in FIGS. 1 through 3.
Figure 10:
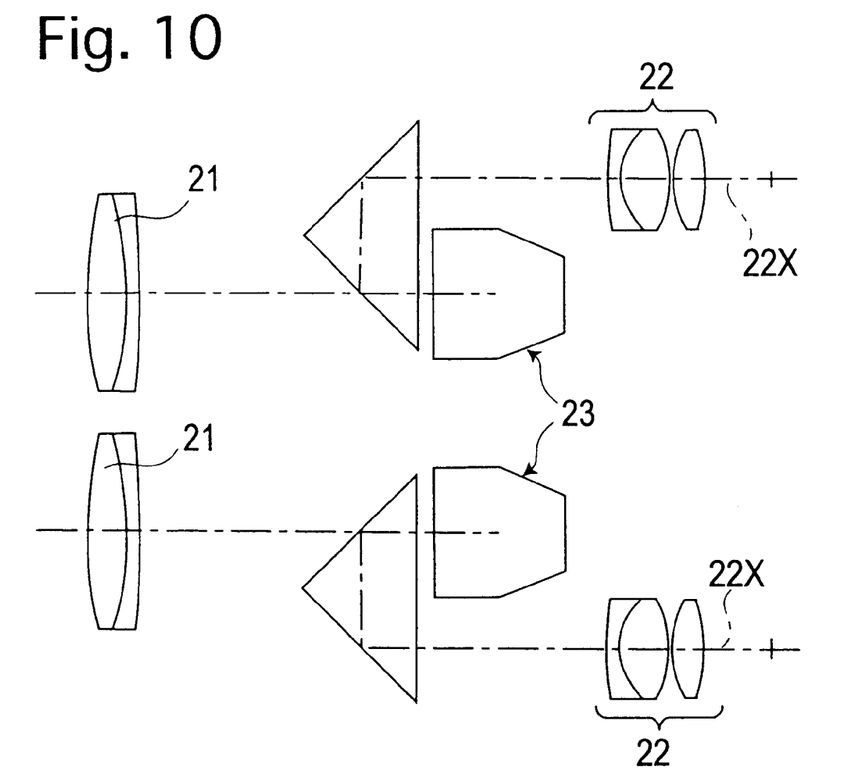
FIG. 10 is a plan view of a binocular to which a close-up attachment lens according to the present invention is applied, by way of example.
Figure 11:
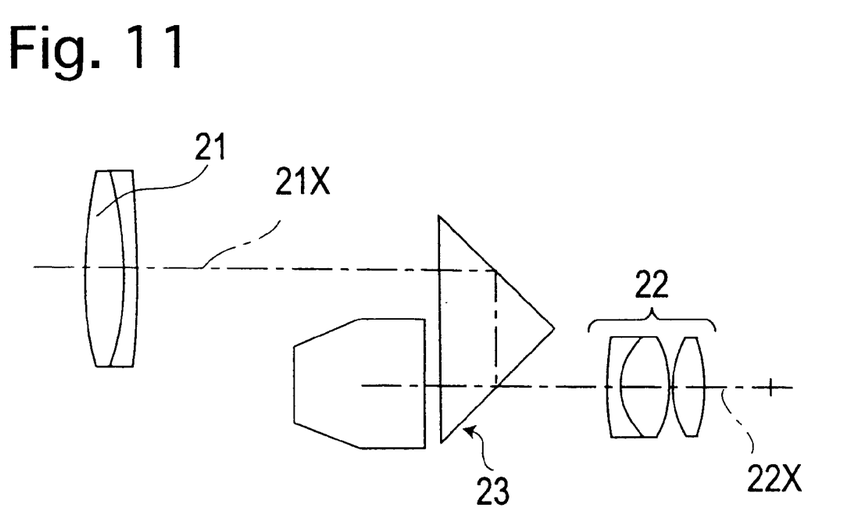
FIG. 11 is a side view of FIG. 10.

The effective aperture of the close-up lens group 13 is defined by the distance between the pair of objective lenses 21, and also the diameter of the aperture stops 15. In an example of the binocular 20, the distance between the optical axes 21X of the objective lenses 21 is smaller than the distance between the optical axes 22X of a pair of eyepieces 22, as shown in FIGS. 10 and 11. If the close-up attachment lens 10 of the present embodiment is combined with the binocular 20 shown in FIGS. 10 and 11, not only can the effective aperture of the close-up lens group 13 be reduced, but also the manufacturing cost and the weight of the close-up attachment lens 10 can be reduced. Note that in the binocular 20, image erecting system 23 are provided between the pair of objective lenses 21 and the eyepieces 22, as shown in FIGS. 5, 10 and 11. Note that in FIG. 5, only one optical system of the binocular is shown.

The lighting device 14 includes a parabolic mirror 14a and a light source (halogen lamp) 14b located at a focal point of the parabolic mirror 14a. The optical axis of the lighting device 14 is identical to the optical axis 13X in a plan view, and is located below and in parallel with the optical axis 13X in a side view. With this arrangement, the beams of the illumination light emitted from the light source 14b are made parallel by the lighting device 14 and reaches the close-up lens group 13. Since the optical axis of the lighting device 14 is parallel with the optical axis 13X of the close-up lens group 13, the illumination light can be effectively converged onto the object to be viewed due to the converging function of the close-up lens group 13.

Figure 3:
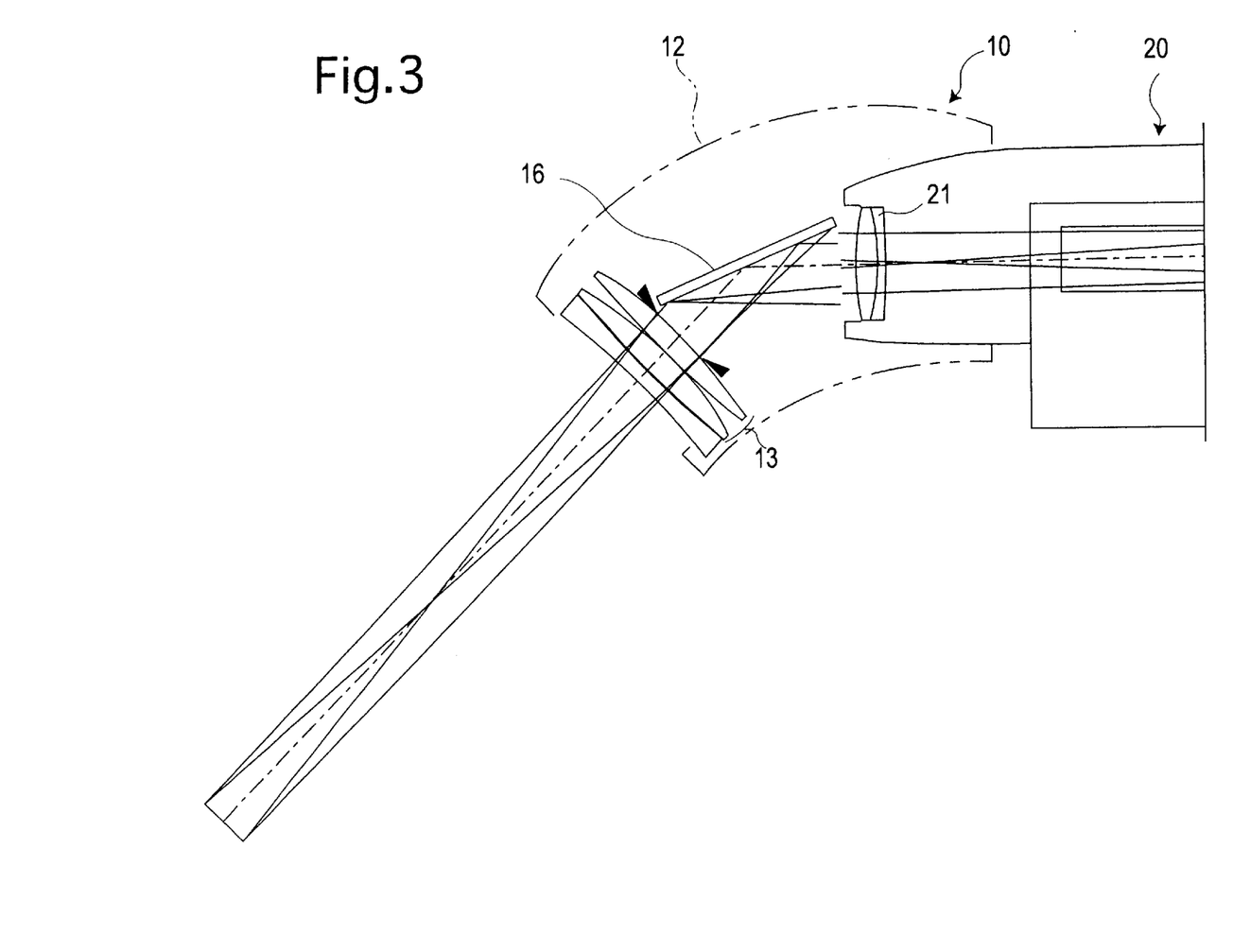
FIG. 3 is a side view corresponding to FIG. 2, of a second embodiment of a close-up attachment lens for a binocular according to the present invention.

FIG. 3 which is a side view corresponding to FIG. 2 shows a second embodiment of the close-up attachment lens 10. In the second embodiment, the casing 12 of the close-up attachment lens 10 is provided with a reflection mirror 16 behind the close-up lens group 13 to bend the light path. In this close-up attachment lens 10, a user can use the binocular 20 at a more comfortable position.

Figure 12:
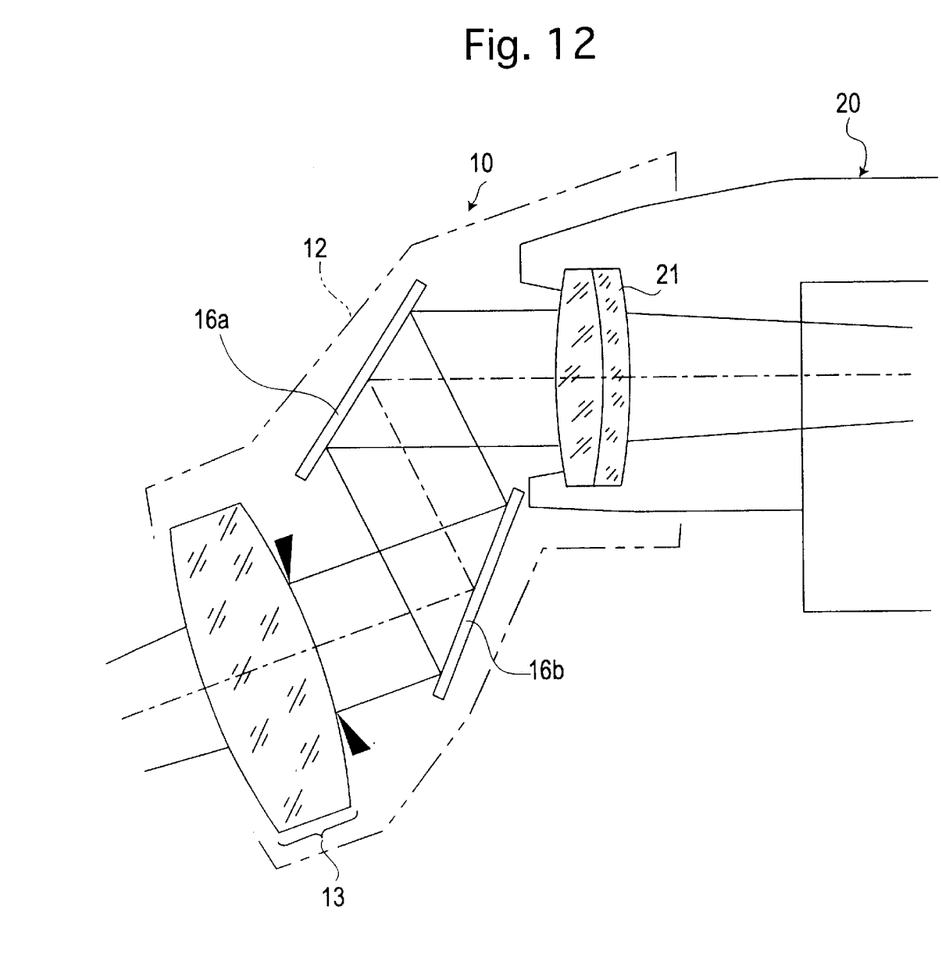
FIG. 12 is a variation of FIG. 3, of a second embodiment of a close-up attachment lens for a binocular according to the present invention.

FIG. 12 is a variation of FIG. 3 of a second embodiment of the close-up attachment lens 10, wherein two reflection mirrors 16a and 16b are utilized, forming an erecting optical system therein.

Figure 4:
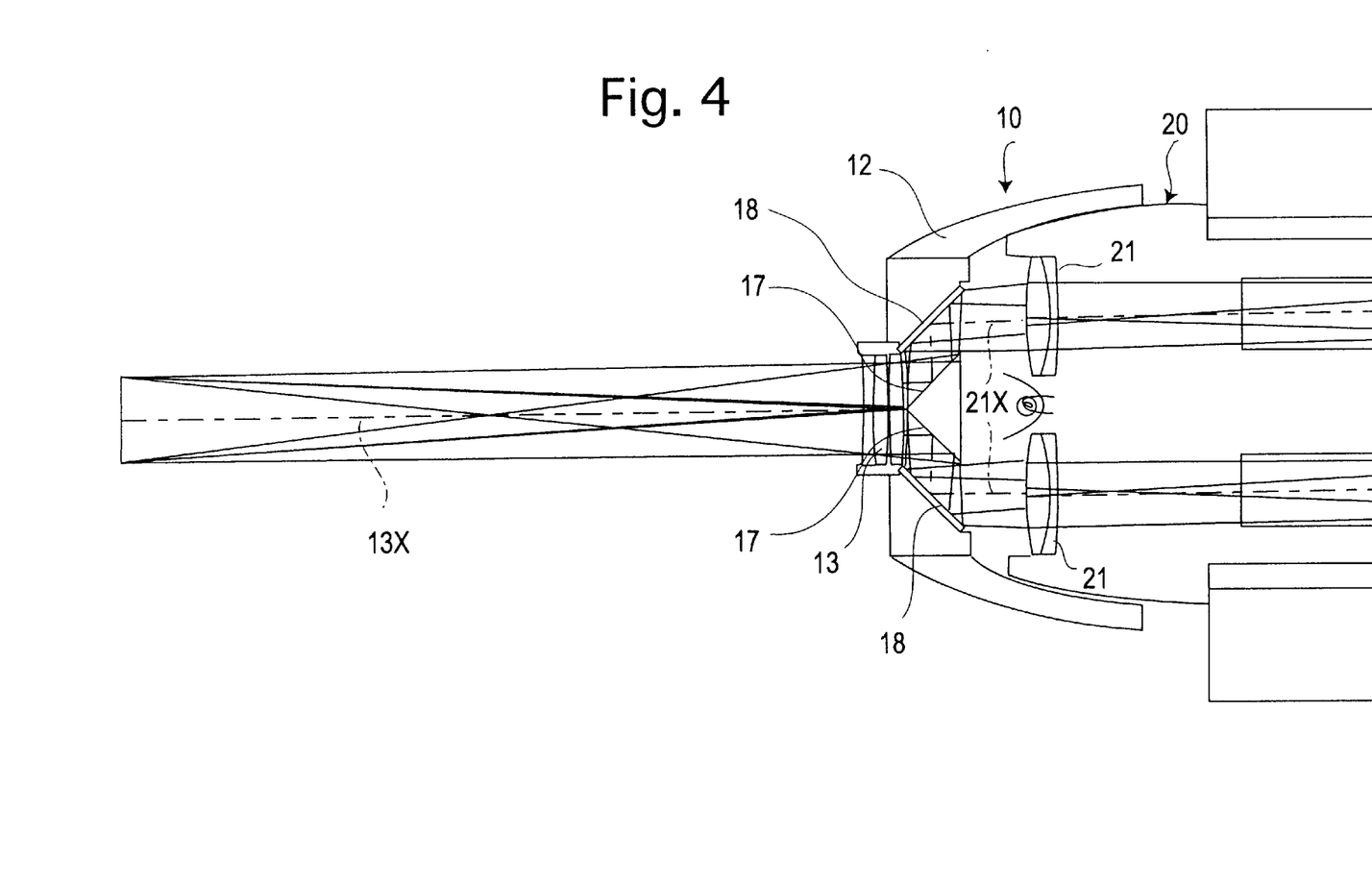
FIG. 4 is a plan view corresponding to FIG. 1, of a third embodiment of a close-up attachment lens for a binocular according to the present invention.

FIG. 4 shows a third embodiment of the close-up attachment lens 10. In this embodiment, the casing 12 of the close-up attachment lens 10 is provided with a pair of first reflection mirrors 17 corresponding to the objective lenses 21 of the binocular 20, behind the close-up lens group 13 to split and bend outward the light transmitted through the close-up lens group 13. Moreover, a pair of second reflection mirrors 18 are provided in the casing 12 and on the light paths of the light reflected by the first reflection mirrors 17. Thus, the light reflected by the first reflection mirrors 17 is reflected by the second reflection mirrors 18 toward the corresponding objective lenses 21. In the third embodiment, the close-up lens group 13 can be made small and thus, the close-up attachment lens can be less costly and lighter in weight than the previous embodiments.

Numerical examples of the close-up lens group 13 will be discussed below. In connection with numerical data in the following examples: "f" designates the focal length, "U-l" the object distance from the first lens surface (R1) of the close-up lens group, "R" the radius of curvature, "D" the lens thickness or distance between lenses, "Nd" the refractive index of the d-line, and "vd" the Abbe number, respectively. In the transverse aberration diagrams, the solid line, the dotted line, and the dotted-dashed line represent transverse aberrations of the d-line, F-line and C-line, respectively. HH represents the object height.

The shape of the rotationally symmetrical aspherical surface is expressed by:

$$x=cy^2/\{1+[-(1+K)c^2y^2]^{1/2}\}+A4y^4+A6y^6+A8y^8+A10y^{10}+A12y^{12+}$$

Wherein:

x designates a distance from a tangent plane of an aspherical vertex;

c designates a curvature (1/R);

y designates a distance from the optical axis;

K designates the conic coefficient;

A4, A6, A8, A10 . . . designate aspherical coefficients at each order, respectively.

<Embodiment 1>

Figure 6:
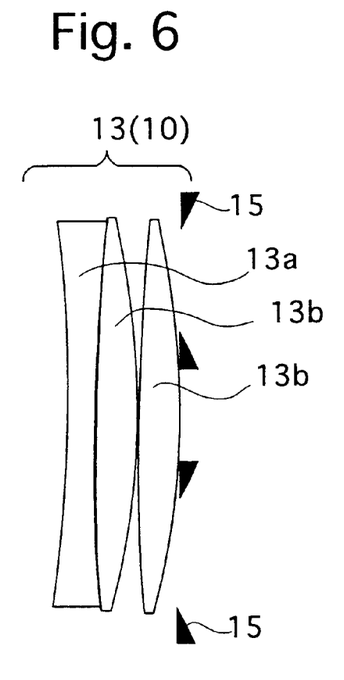
FIG. 6. is a sectional view of a first embodiment of a single close-up lens group.
Figure 7A:
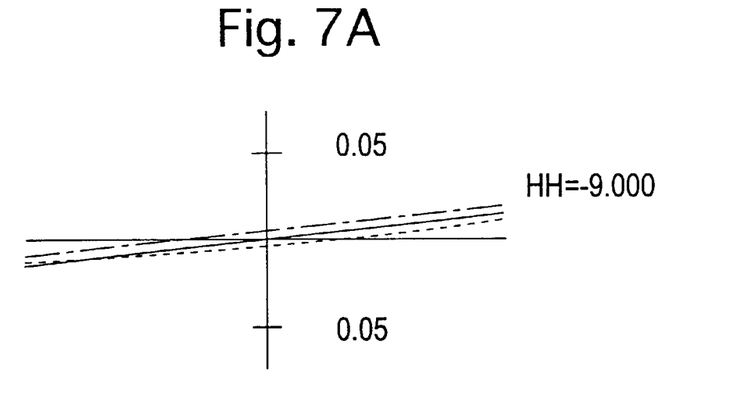
FIGS. 7a, 7b, and 7c show transverse aberration diagrams of a first embodiment of a close-up lens group shown in FIG. 6.
Figure 7B:
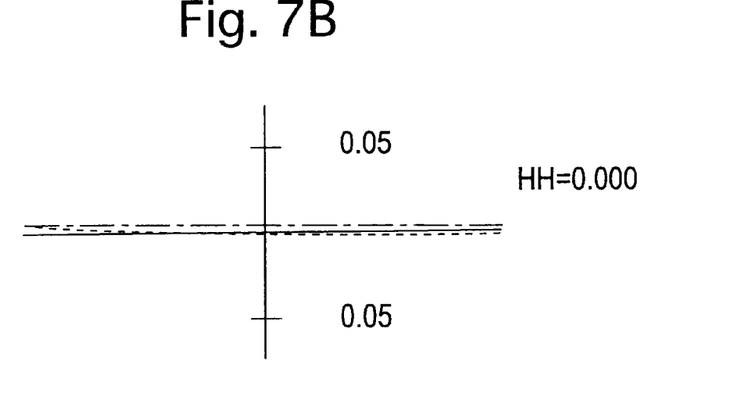
Figure 7C:
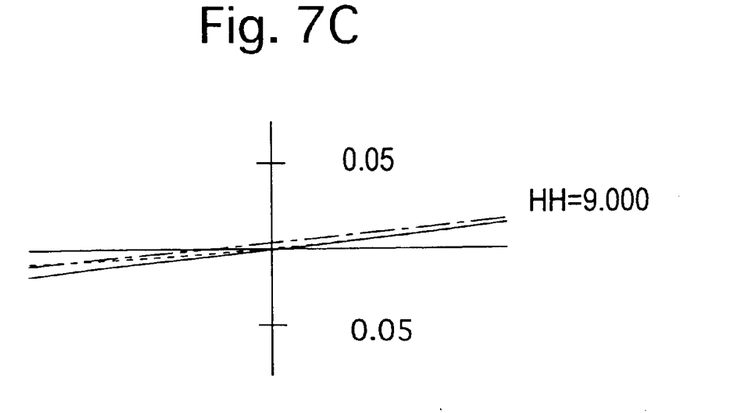

FIG. 6 show a first embodiment of the close-up lens group 13 used in a close-up attachment lens 10. Table 1 shows numerical data thereof and FIG. 7 shows transverse aberrations.

The close-up lens group 13 is comprised of a biconcave lens 13a and two identical bi-convex lenses 13b, in this order from the object side. The close-up lens group 13 has positive power. Owing to the share of the positive power by the two positive lenses 13b, the power of each positive lens can be reduced and hence the refractive index and the thickness of the positive lenses can be reduced, thus resulting in an inexpensive close-up attachment lens 10. in the embodiment shown in FIG. 6, since the two positive lenses are identical, a reduced manufacturing cost can be attained.

TABLE 1 f = 170.02
U − 1 = 156.12

| surface No. | R | D | Nd | υd |
|---|---|---|---|---|
| 1 | −248.000 | 4.00 | 1.72825 | 28.46 |
| 2 | 248.000 | 0.34 | — | — |
| 3 | 321.250 | 6.00 | 1.49176 | 57.46 |
| *4 | −116.206 | 0.20 | — | — |
| 5 | 321.250 | 6.00 | 1.49176 | 57.46 |
| *6 | −116.206 | — | — | — |

Diameter of the aperture stop: 16.00
Distance between the axis of the close-up lens group 13 and the center of the aperture stop: 13.50.

The symbol * designates a rotationally symmetrical aspherical surface.

Aspherical surface data (the aspherical surface coefficients not indicated are zero (0.00)):

| surface No. | K | A4 | A6 |
|---|---|---|---|
| 4 | 0.000 | −7.3500 × 10$^{-9}$ | −3.5000 × 10$^{-12}$ |
| 6 | 0.000 | −7.3500 × 10$^{-9}$ | −3.5000 × 10$^{-12}$ |

<embodiment 2>

Figure 8:
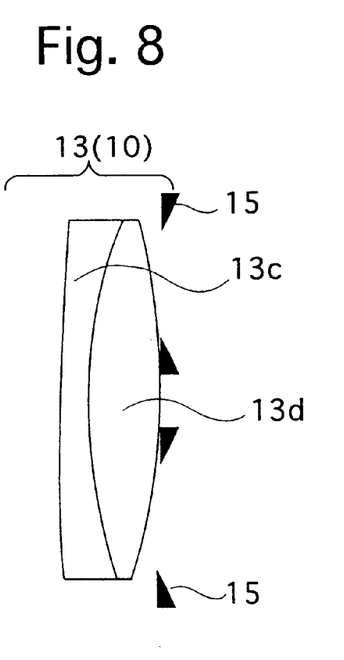
FIG. 8 is a sectional view of a second embodiment of a single close-up lens group.
Figure 9A:
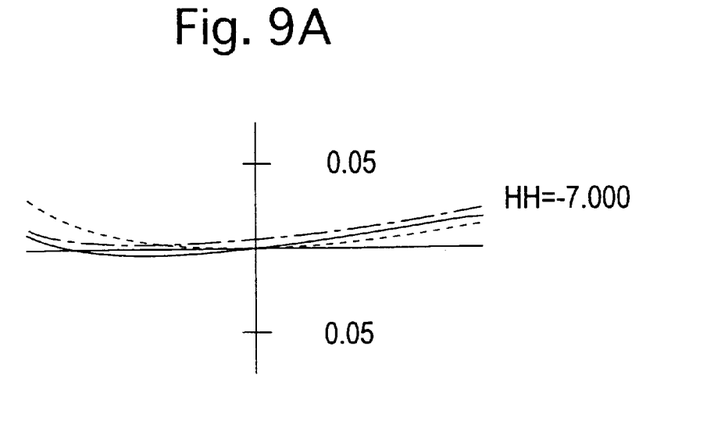
FIGS. 9a, 9b, and 9c show transverse aberration diagrams of a second embodiment of a close-up lens group shown in FIG. 8.
Figure 9B:
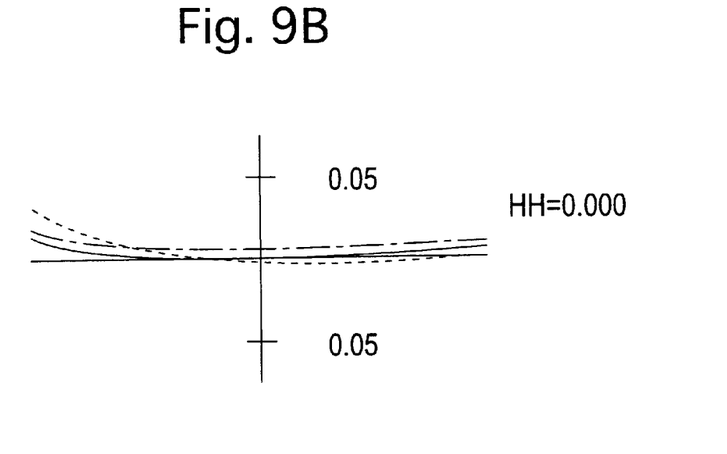
Figure 9C:
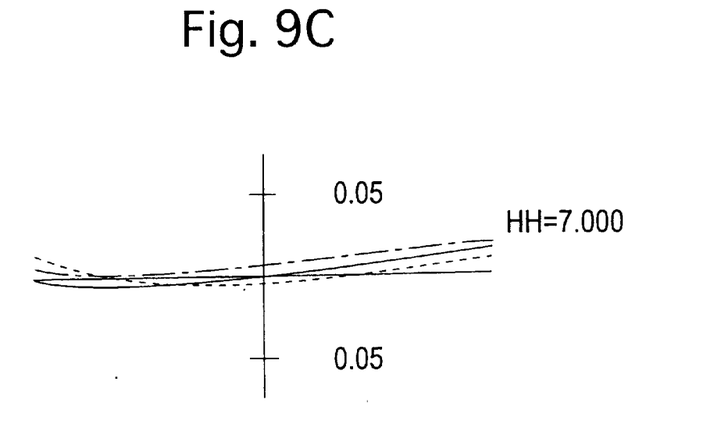

FIG. 8 shows a second embodiment of the close-up lens group 13 used in a close-up attachment lens 10 according to the present invention. Table 2 show numerical data thereof and FIG. 9 shows transverse aberrations.

The close-up lens group 13 is comprised of a meniscus concave lens 13c and a bi-convex lens 13d cemented thereto, in this order from the object side. The close-up lens group 13 has positive power. If the magnification or required image quality can be smaller or less than that of the close-up lens group 13 of the first embodiment illustrated in FIG. 6 or if a glass material whose refractive index is higher than the glass material used in the first embodiment is employed, the close-up lens group 13 may be made of one negative lens and one positive lens. Moreover, if the close-up lens group 13 is made of a cemented lens (of positive and negative lens elements) as in the second embodiment, misalignment of the optical axes of the lens elements does not tend to occur, and thus, it is possible to restrict accidental deviation of the optical axis of the lens elements which constitute the close-up attachment lens 10 due to shock, etc., and prevents the image quality from being deteriorated.

TABLE 2 f = 155.04
U − 1 = 147.34

| surface No. | R | D | Nd | υd |
|---|---|---|---|---|
| 1 | 217.200 | 4.00 | 1.62004 | 36.26 |
| 2 | 62.530 | 11.50 | 1.51633 | 64.15 |
| 3 | −96.900 | — | — | — |

Diameter of the aperture stop: 16.00
Distance between the axis of the close-up lens group 13 and the center of the aperture stop: 16.50

In the above descriptions, the numerical data of the first embodiment has been applied to FIGS. 1 through 5, however, the numerical data of the second embodiment can also be applied to FIGS. 1 through 5.

As can be understood from the foregoing, according to the present invention, a close-up attachment lens for a binocular in which no complex adjustment of the optical axis is necessary or no positional deviation of the optical axis due to shock or the like tends to occur can be obtained.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A close-up attachment lens for a binocular, which is detachably attached on an object side of a pair of objective lenses of the binocular, said close-up attachment lens comprising:

a close-up lens group comprising a single optical system of positive power, said close-up lens group being located on the object side of the pair of objective lenses of the binocular, so that the close-up lens group covers the pair of objective lenses and has an optical axis parallel with, and spaced from, optical axes of the objective lenses by an equal distance, a pair of aperture stops, said aperture stops being located in front of the corresponding objective lenses of the binocular when the close-up attachment lens is attached to the binocular; and a frame supporting said close-up lens group and said pair of aperture stops in fixed positions relative to each other, wherein a diameter of the aperture stops is set to smaller than an effective aperture of the objective lenses of the binocular.

2. A close-up attachment lens for a binocular according to claim 1, further comprising at least one reflection mirror, said reflection mirror being located in front of the objective lenses of the binocular when the close-up lens is attached to the binocular.

3. A close-up attachment lens for a binocular according to claim 2, wherein said at least one reflection mirror is provided behind the close-up lens group.

4. A close-up attachment lens for a binocular according to claim 1, further comprising a pair of first reflection mirrors provided behind the close-up lens group, corresponding to the objective lenses of the binocular to split, and deflect outward, light transmitted through the close-up lens group and a pair of second reflection mirrors to reflect the rays of light reflected by the first reflection mirrors toward the corresponding objective lenses of the binocular.

5. A clogs-up attachment lens for a binocular according to claim 1, further comprising a lighting optical system.

6. A close-up attachment lens for a binocular according to claim 5, wherein said lighting optical system is provided behind the close-up lens system.

7. A close-up attachment lens for a binocular according to claim 6, wherein said lighting optical system gathers light rays at a proximity of an object point via a refractive function of the close-up optical system.

8. A close-up attachment lens for a binocular according to claim 5, wherein said light optical system comprises a curved reflection mirror which reflects light rays toward the object side, wherein said lighting optical system has an optical axis which is parallel with the optical axis of the close-up lens group.

9. A close-up attachment lens for a binocular according to claim 8, wherein said curved reflection mirror comprises a parabolic mirror.

10. A close-up attachment lens for a binocular according to claim 1, wherein said close-up lens group comprises a negative lens element and two positive lens elements.

11. A close-up attachment lens for a binocular according to claim 10, wherein the two positive lens elements in the close-up lens group are identical.

12. A close-up attachment lens for a binocular according to claim 1, wherein said close-up lens group comprises a negative lens element, a positive lens element, and another positive lens element, in this order from the object side.

13. A close-up attachment lens for a binocular according to claim 12, wherein the two positive lens elements in the close-up lens group are identical.

14. A close-up attachment lens for a binocular according to claim 1, wherein said close-up lens group comprises a negative lens element and a positive lens element.

15. A close-up attachment lens for a binocular according to claim 14, wherein the negative lens element and the positive lens element are arranged in this order from the object side.

16. A close-up attachment lens for a binocular according to claim 1, wherein said close-up lens group comprises a cemented lens.

17. A close-up attachment lens for a binocular according to claim 1, wherein the binocular is provided with a pair of ocular lens system corresponding to the pair of the objective optical systems, wherein a distance between the optical axes of the objective lenses is smaller than a distance between optical axes of the ocular optical systems.

18. A close-up attachment lens for a binocular according to claim 1, wherein said pair of aperture stops are provided behind the close-up lens group.

* * * * *